US008953660B2

United States Patent
Khayrallah et al.

(10) Patent No.: US 8,953,660 B2
(45) Date of Patent: Feb. 10, 2015

(54) PILOT STRUCTURE TO SUPPORT A VIRTUAL DIVERSITY RECEIVER SCHEME

(71) Applicant: Telefonaktiebolaget L M Ericsson (PUBL), Stockholm (SE)

(72) Inventors: Ali S. Khayrallah, Mountain View, CA (US); Yi-Pin Eric Wang, Fremont, CA (US)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 59 days.

(21) Appl. No.: 13/633,731

(22) Filed: Oct. 2, 2012

(65) Prior Publication Data

US 2014/0092944 A1  Apr. 3, 2014

(51) Int. Cl.
H04B 1/38 (2006.01)
H04L 25/02 (2006.01)
H04B 7/06 (2006.01)

(52) U.S. Cl.
CPC .......... *H04L 25/0224* (2013.01); *H04B 7/0697* (2013.01)
USPC .......... 375/219; 375/220; 375/221; 375/227; 375/260; 375/267; 375/299; 375/347

(58) Field of Classification Search
CPC . H04B 7/0452; H04B 7/0697; H04L 25/0224
USPC ......... 375/219, 220, 221, 227, 260, 267, 295, 375/299, 347
See application file for complete search history.

(56) References Cited

U.S. PATENT DOCUMENTS

| 7,986,750 | B2 * | 7/2011 | Hwang et al. ................. 375/316 |
| 8,351,555 | B2 | 1/2013 | Semenov et al. |
| 2010/0111044 | A1 * | 5/2010 | Kawamura et al. ........... 370/335 |
| 2012/0243503 | A1 * | 9/2012 | Mochida ....................... 370/330 |

OTHER PUBLICATIONS

Larson, Peter and Niklas Johansson, "Multi-User ARQ," IEEE VTC Spring, 2006, 2052-2057.
Maddah-Ali, Mohammad Afi et al., "Completely Stale Transmitter Channel State Information is Still Very Useful," Allerton Conference 2010, Sep. 26, 2011, arXiv:1010.1499v2, 26 pages.
Office Action issued in U.S. Appl. No. 13/633,733, dated Jan. 31, 2014, 15 pages.
Notice of Allowance dated May 21, 2014, U.S. Appl. No. 13/633,733, filing date: Oct. 2, 2012, 15 pages.

* cited by examiner

*Primary Examiner* — Leon Flores
(74) *Attorney, Agent, or Firm* — Rothwell, Figg, Ernst & Maneck, P.C.

(57) ABSTRACT

Devices and methods for providing a pilot structure for a virtual diversity receiver (VDR) scheme are disclosed. In order to improve the performance of a communication network, a VDR scheme is implemented to facilitate the exchange of information between user devices via an intermediary device, such as a base station. The pilot structure supports estimation of channel parameters at the receivers, including true channel taps, as well as estimations of the virtual channels created by the VDR scheme in order to enable the use of receive-diversity signal processing techniques.

42 Claims, 12 Drawing Sheets

| | Radio resource element 1 | Radio resource element 2 | Radio resource element 3 | Radio resource element 4 |
|---|---|---|---|---|
| $p_1[1]$ | 1 | 1 | 1 | 1 |
| $p_2[1]$ | 1 | 1 | −1 | −1 |
| $p_1[2]$ | 1 | −1 | 1 | −1 |
| $p_2[2]$ | 1 | −1 | −1 | 1 |

1202 — Transmitting, from a First Base Station, a First Plurality of Information Symbols Intended for a First User Device, Including a First Set of Data Symbols and a First Pilot Sequence 1204 — Transmitting, from the First Base Station, a Second Plurality of Information Symbols Intended for a Second of User Device, Including a Second Set of Data Symbols and a Second Pilot Sequence 1206 — Receiving, at the First Base Station, a First Channel Estimate and a Second Channel Estimate from the First User Device Based on the Second Transmission 1208 — Receiving, at the First Base Station, One or More Inter-Base Station Messages Comprising Channel Estimates and Information Symbols From a Second Base Station 1210 — Transmitting, from the First Base Station, one or more Composite Symbols Based on the First and Second Information Symbols, the First and Second Channel Estimates, and the Inter-Base Station Message

FIG. 12

# PILOT STRUCTURE TO SUPPORT A VIRTUAL DIVERSITY RECEIVER SCHEME

TECHNICAL FIELD

The present invention relates generally to improving data transmission on telecommunication networks and, more particularly, to a method and device for providing a pilot structure to support a virtual diversity receiver scheme in a telecommunication network.

BACKGROUND

3GPP Long Term Evolution (LTE) is a standard for mobile phone network technology. LTE is a set of enhancements to the Universal Mobile Telecommunications System (UMTS), and is a technology for realizing high-speed packet-based communication that can reach high data rates on both downlink and uplink channels. As illustrated in FIG. 1, LTE transmissions are sent from base stations 102, such as Node Bs (NBs) and evolved Node Bs (eNBs) in a telecommunication network 106, to mobile stations 104 (e.g., user equipment (UE)). Examples of wireless UE communication devices include mobile telephones, personal digital assistants, electronic readers, portable electronic tablets, personal computers, and laptop computers.

The LTE standard is primarily based on Orthogonal Frequency Division Multiplexing (OFDM) in the downlink, which splits the signal into multiple parallel sub-carriers in frequency, and Single Carrier Frequency Domain Multiple Access (SC-FDMA) in the uplink. A transmit time interval (TTI) is the basic logical unit. A radio resource element (RE) is the smallest addressable location within a TTI, corresponding to a certain time location and a certain frequency location. For instance, as illustrated in FIG. 2, a sub-frame 200 comprised of REs 202 may be transmitted in a TTI in accordance with the LTE standard, and may consist of sub-carriers 204 in the frequency domain. In the time domain, the sub-frame may be divided into a number of OFDM (or SC-FDMA) symbols 208. An OFDM (or SC-FDMA) symbol 208 may include a cyclic prefix 206. Thus, the unit of one sub-carrier and one symbol is a resource unit or element 202.

Wireless communication systems may be deployed in a number of configurations, such as, for example, a Multiple-Input, Multiple-Output (MIMO) radio system. An exemplary MIMO system including a base station 302, such as an eNB, and user equipment 304 is shown in FIG. 3. When a signal is transmitted by the eNB 302 in a downlink, i.e., the link carrying transmissions from the eNB to the UE 304, a sub-frame may be transmitted from multiple antennas 306, 308 and the signal may be received at a UE 304, which has one or more antennas. The radio channel distorts the transmitted signals from the multiple antenna ports. UE 304 may use receiver-diversity signal processing schemes to improve performance.

In an LTE system, transmissions intended for a first user are often overheard by a second, unintended user. The second user may utilize overheard data packets in various ways. For instance, "*Completely Stale Transmitter Channel State Information is Still Very Useful*," by M. Maddah-Ali and D. Tse, Allerton Conference, 2010, describes a multi-user downlink MIMO scheme with a mechanism for information exchange between single antenna terminals, where the terminals feedback channel state information (CSI) to the serving base station. The serving base station exploits this CSI to broadcast an additional signal, which each terminal uses to create a virtual diversity receiver (VDR). This type of information exchange may be referred to as "stale feedback," since the channel may have changed significantly by the time the base station transmits the extra signal. In this scheme, a mobile device that receives signals on only a single antenna may still take advantage of simple receive-diversity processing techniques. Similarly, "*Multi-User ARQ*," by Peter Larsson and Nicklas Johansson, IEEE VTC Spring, 2006, discusses an Automated Repeat request (ARQ) control scheme that exploits the fact that users frequently overhear each other's information.

Absent from the presently known schemes is an explicit pilot structure that can be effectively used to facilitate the estimation of channel parameters at the receivers, including true channel taps, as well as estimations of the virtual channels created by the VDR scheme. The lack of pilot structure renders these schemes incomplete and unusable in practice.

Accordingly, there is a need for a pilot structure to support a virtual diversity receiver scheme in an LTE communication network in order to improve transmission quality.

SUMMARY

Particular embodiments of the present invention are directed to devices and methods for providing a pilot structure for a virtual diversity receiver (VDR) scheme in order to improve the performance of a communication network. The VDR scheme is comprised of information exchanges between user devices (terminals) via an intermediary device, such as a base station, which enables each terminal to access the received signal of another terminal. The use of a VDR boosts performance for each terminal; each terminal performs as if it has more receive antennas than it actually does, enabling the use of receive-diversity signal processing techniques.

In one particular aspect, a method for improving performance in a communication network is provided. The method includes receiving, at a first user device, a first plurality of received information symbols that are intended for the first user device. These received information symbols include a first set of data symbols and a first plurality of pilot sequences. The method also includes receiving, at the first user device, a second plurality of received information symbols intended for a second and different user device, which include a second set of data symbols and a second plurality of pilot sequences. The first user device then determines a first channel estimate based on a first sequence of the second plurality of pilot sequences, and determines a second channel estimate based on a second sequence of the second plurality of pilot sequences. The first and second channel estimates are then transmitted from the first user device, for example, to a base station. The method may also include determining the first channel estimate by correlating the second plurality of received information symbols with a first sequence of the second plurality of pilot sequences and determining the second channel estimate by correlating the second plurality of received information symbols with a second sequence of the second plurality of pilot sequences.

The method further includes receiving, at the first user device, one or more composite symbols, including one or more composite pilot sequences based on the first and second plurality of pilot sequences. The first user device may then determine an estimated effective signal value based on at least one of said received composite symbols. For instance, the first user device determines a third channel estimate based on the received composite symbols, and forms a plurality of effective signal values using VDR processing based on the third channel estimate, the second plurality of received information symbols, and the received composite symbols. Based on the first plurality of received information symbols, the effective signal values, and the estimated effective virtual antenna channels, the first user device may then demodulate the first set of data symbols.

Particular embodiments of the present invention provide a device operable in a communication network to receive a first plurality of received information symbols that are intended for the device. These received information symbols include a first set of data symbols and a first plurality of pilot sequences. The device is also configured to receive a second plurality of received information symbols intended for a second and different user device, which include a second set of data symbols and a second plurality of pilot sequences. The device includes an antenna configured to receive the received information symbols, and a processor coupled to the antenna. The processor is configured to determine a first channel estimate based on a first sequence of the second plurality of pilot sequences, and determine a second channel estimate based on a second sequence of the second plurality of pilot sequences. The device is further configured to transmit the first and second channel estimates, for example, to a base station. The processor may be further configured to determine the first channel estimate by correlating the second plurality of received information symbols with a first sequence of the second plurality of pilot sequences and determine the second channel estimate by correlating the second plurality of received information symbols with a second sequence of the second plurality of pilot sequences.

In certain aspects, the device is also configured to receive one or more composite symbols, including one or more composite pilot sequences based on the first and second plurality of pilot sequences. The processor may then determine an estimated effective signal value based on at least one of said received composite symbols. Based on the first plurality of received information signals and the estimated effective signal value, the first user device may then demodulate the first set of data symbols using the processor.

In another aspect, particular embodiments of the present invention provide a method for improving performance in a communication network, which includes transmitting a first plurality of information symbols that are intended for a first user device, including a first set of data symbols and a first plurality of pilot sequences. The method also includes transmitting a second plurality of information symbols intended for a second user device, including a second set of data symbols and a second plurality of pilot sequences. A first set of channel estimates is received from the second user device, and a second set of channel estimates is received from the first user device. According to certain aspects, the first set of channel estimates is based on the first transmission and the second set of channel estimates is based on the second transmission. The method further includes determining one or more composite symbols based on the first and second sets of channel estimates and the first and second sets of data symbols. The composite symbols include one or more composite pilot sequences, which are based on the first and second plurality of pilot sequences. For instance, the composite pilot sequence may be a linear combination of the first and second plurality of pilot sequences. The method also includes transmitting the one or more composite symbols to both the first and second user devices.

According to certain aspects, determining the composite symbols includes synthesizing a first estimated receive value indicative of one or more signals received at the first user device, and synthesizing a second estimated receive value indicative of one or more signals received at the second user device. These synthesized values are combined to determine the composite symbols.

Particular embodiments of the present invention provide a base station device operable in a communication network to transmit information to a plurality of user devices. The base station includes a plurality of transmit antennas and a processor coupled to the antennas and configured to transmit a first plurality of information symbols intended for a first user device, including a first set of data symbols and a first plurality of pilot sequences. The processor is also configured to transmit a second plurality of information symbols intended for a second user device, including a second set of data symbols and a second plurality of pilot sequences. A first set of channel estimates is received from the second user device, and a second set of channel estimates is received from the first user device. The processor is further configured to determine one or more composite symbols based on the first and second sets of channel estimates and the first and second sets of data symbols. The composite symbols include one or more composite pilot sequences, which are based on the first and second plurality of pilot sequences. For instance, the composite pilot sequence may be a linear combination of the first and second plurality of pilot sequences. The processor is also configured to transmit the one or more composite symbols to both the first and second user devices.

In another aspect, particular embodiments of the present invention are directed to a method for improving performance in a communication network that has a plurality of base stations and a plurality of user devices. The method includes transmitting, from a first of the plurality of base stations, a first plurality of information symbols intended for a first of the plurality of user devices. The information symbols include a first set of data symbols and a first pilot sequence. The method also includes transmitting, from the first base station, a second plurality of information symbols intended for a second, and different, user device, which includes a second set of data symbols and a second pilot sequence. A first channel estimate and a second channel estimate are received at the first base station from the first user device. Additionally, one or more inter-base station messages, comprising of channel estimates and information symbols, from a second of said plurality of base stations are received at the first base station. The first base station then transmits one or more composite symbols based on the first and second channel estimates, first and second plurality of information symbols, and the inter-base station messages transmitted from the second base station.

According to certain aspects, the one or more communications are received from the second base station. These communications may be comprised of the information symbols previously transmitted from the second base station.

Particular embodiments of the present invention provide a base station device operable in a communication network to transmit information to a plurality of user devices. The base station includes a plurality of transmit antennas and a processor coupled to the antennas and configured to transmit a first plurality of information symbols intended for a first user device. The information symbols include a first set of data symbols and a first pilot sequence. The processor is also configured to transmit a second plurality of information symbols intended for a second, and different, user device, which includes a second set of data symbols and a second pilot sequence. A first channel estimate and a second channel estimate for a second transmission are received by the base station from the first user device. Additionally, one or more inter-base station messages, comprising of channel estimates and information symbols, transmitted from a second of said plurality of base stations are received by the base station. The processor is further configured to transmit or more composite symbols based on the first and second channel estimates, first and second plurality of information symbols, and the inter-base station messages transmitted from the second base station.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 8 is an illustration of pilot sequences in accordance with exemplary embodiments of the present invention.

FIG. 12 is a flow chart illustrating a process for improving performance in a communication network in accordance with exemplary embodiments of the present invention.

DETAILED DESCRIPTION

Particular embodiments of the present invention are directed to devices and methods for providing a pilot structure for a virtual diversity receiver (VDR) scheme.

Figure 1:
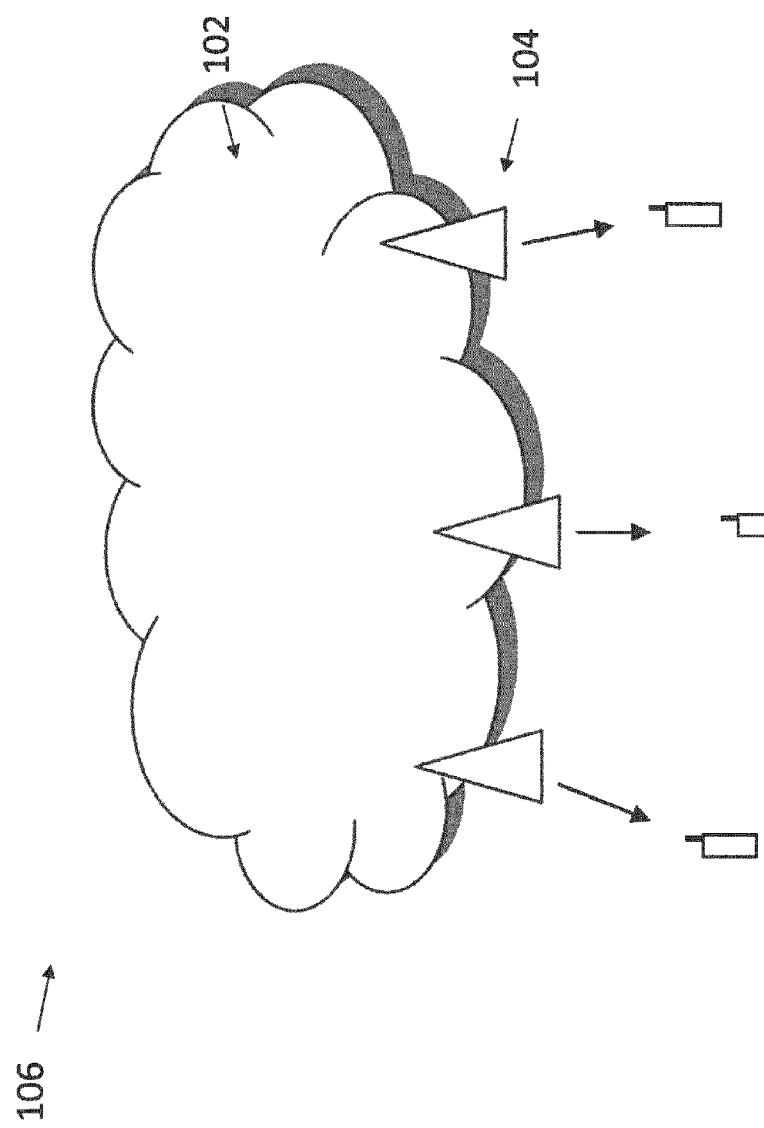
FIG. 1 is an illustration of a wireless communication system.
Figure 2:
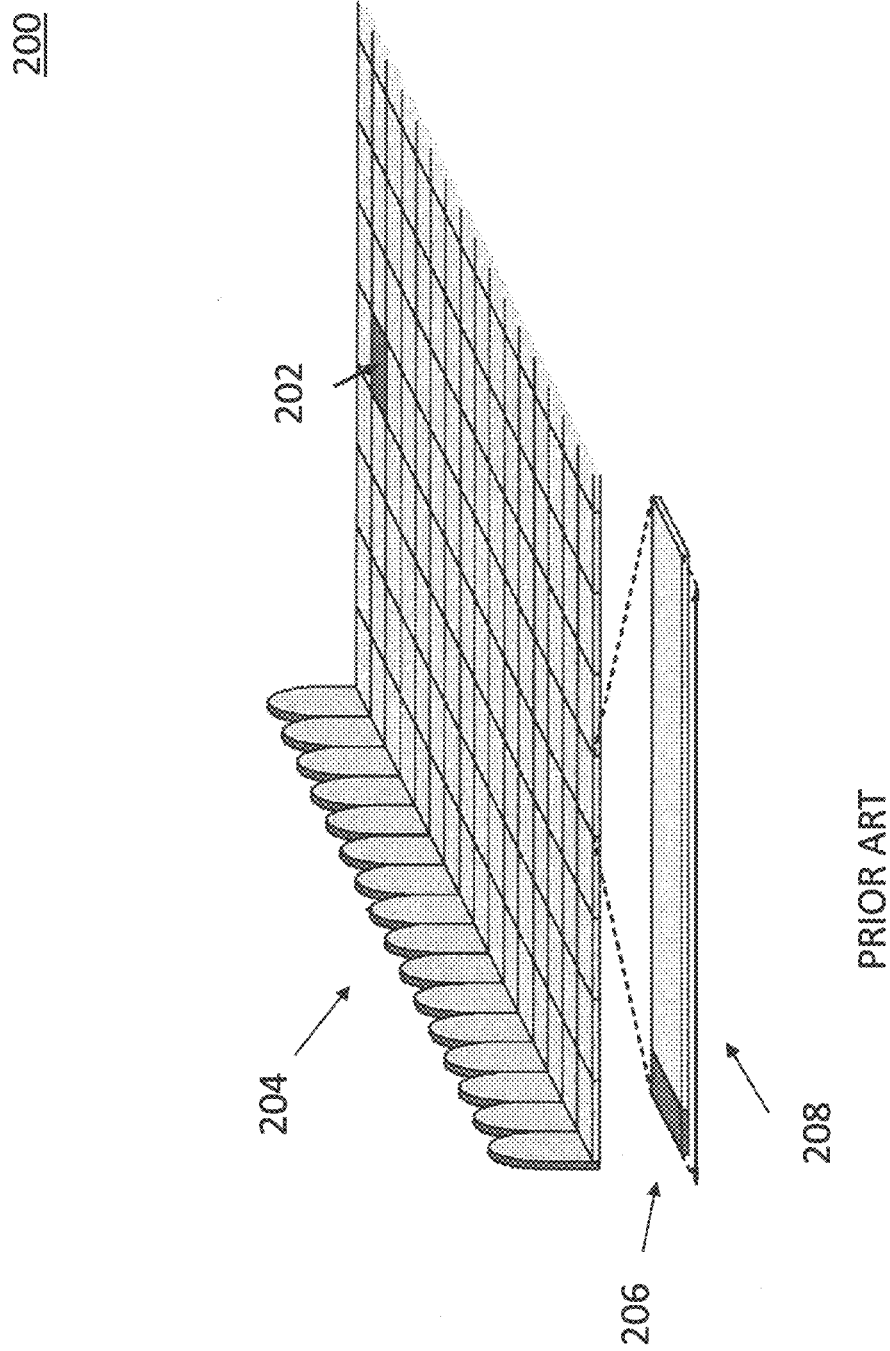
FIG. 2 is an exemplary sub-frame of an LTE transmission.
Figure 3:
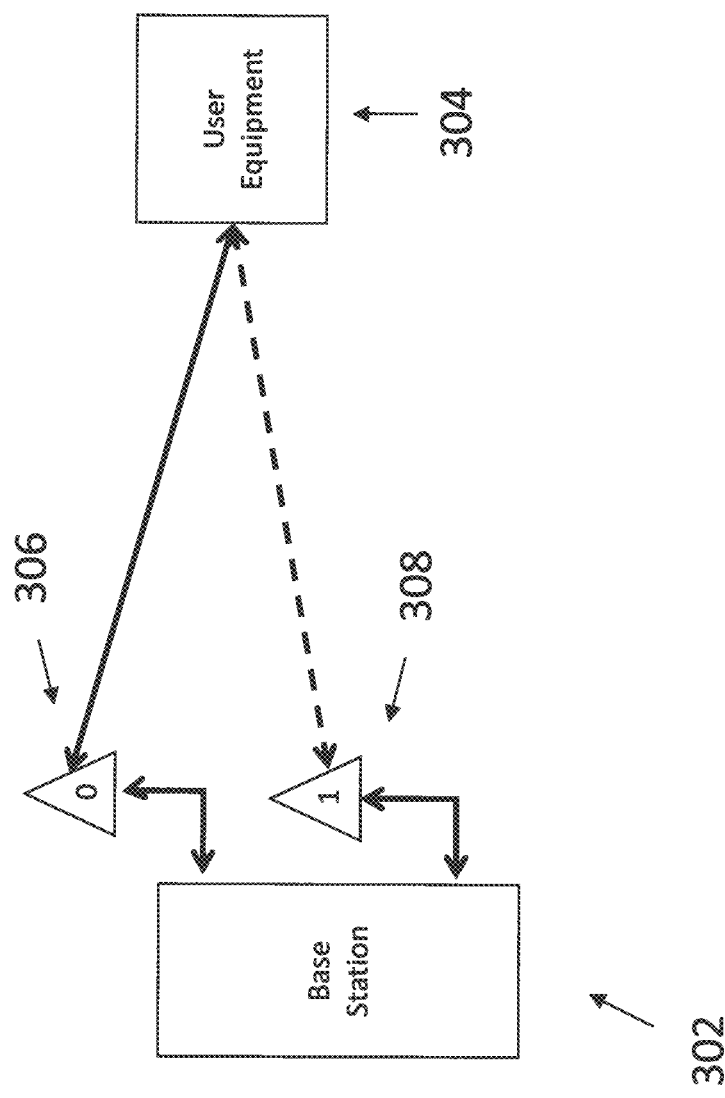
FIG. 3 is a block diagram of an exemplary MIMO system.
Figure 4:
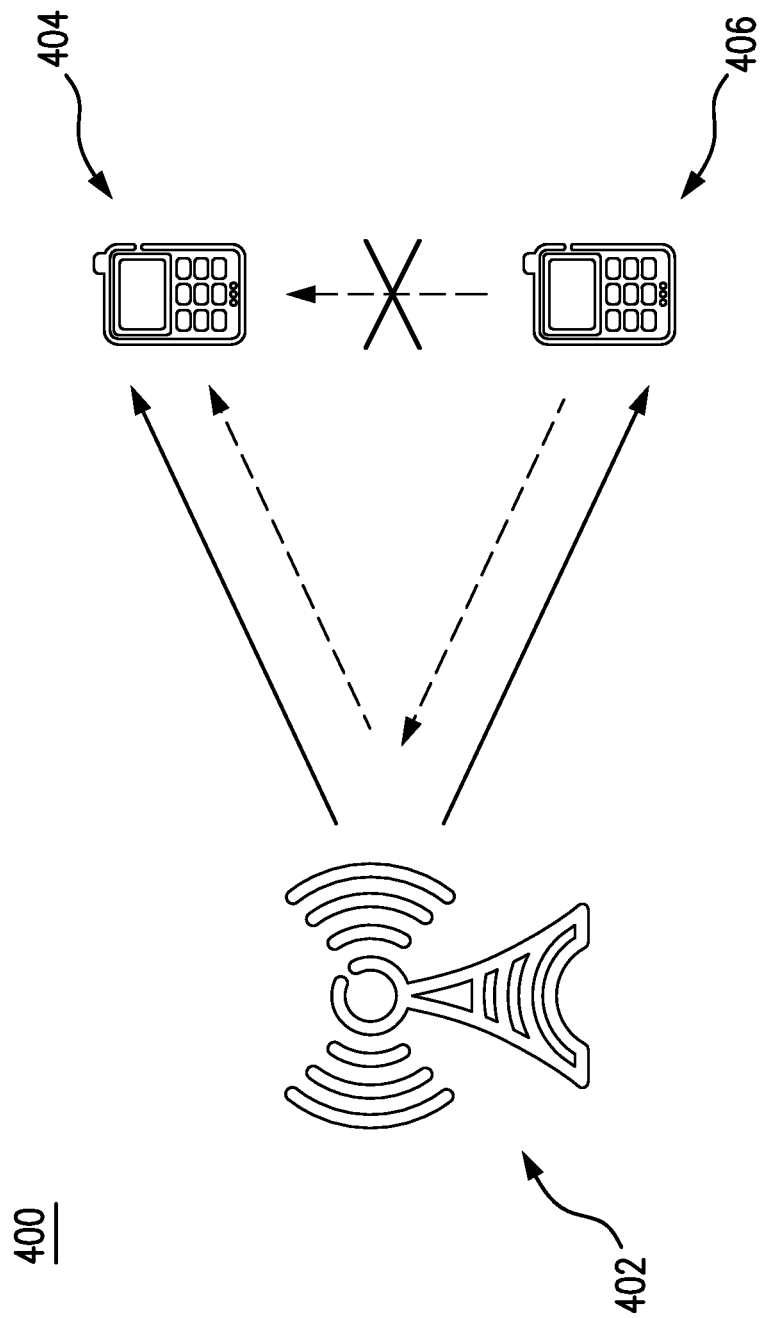
FIG. 4 is an illustration of a wireless communication system in accordance with exemplary embodiments of the present invention.

In order to improve the performance of a communication network, a VDR scheme may be implemented to exchange information between user devices via an intermediary device, such as a base station, as shown for example in FIG. 4. The pilot structure supports estimation of channel parameters at the receivers, including true channel taps, as well as estimations of the virtual channels created by the VDR scheme. Accordingly, each terminal performs as if it has more receive antennas than it actually does, enabling the use of receive-diversity signal processing techniques.

Figure 5:
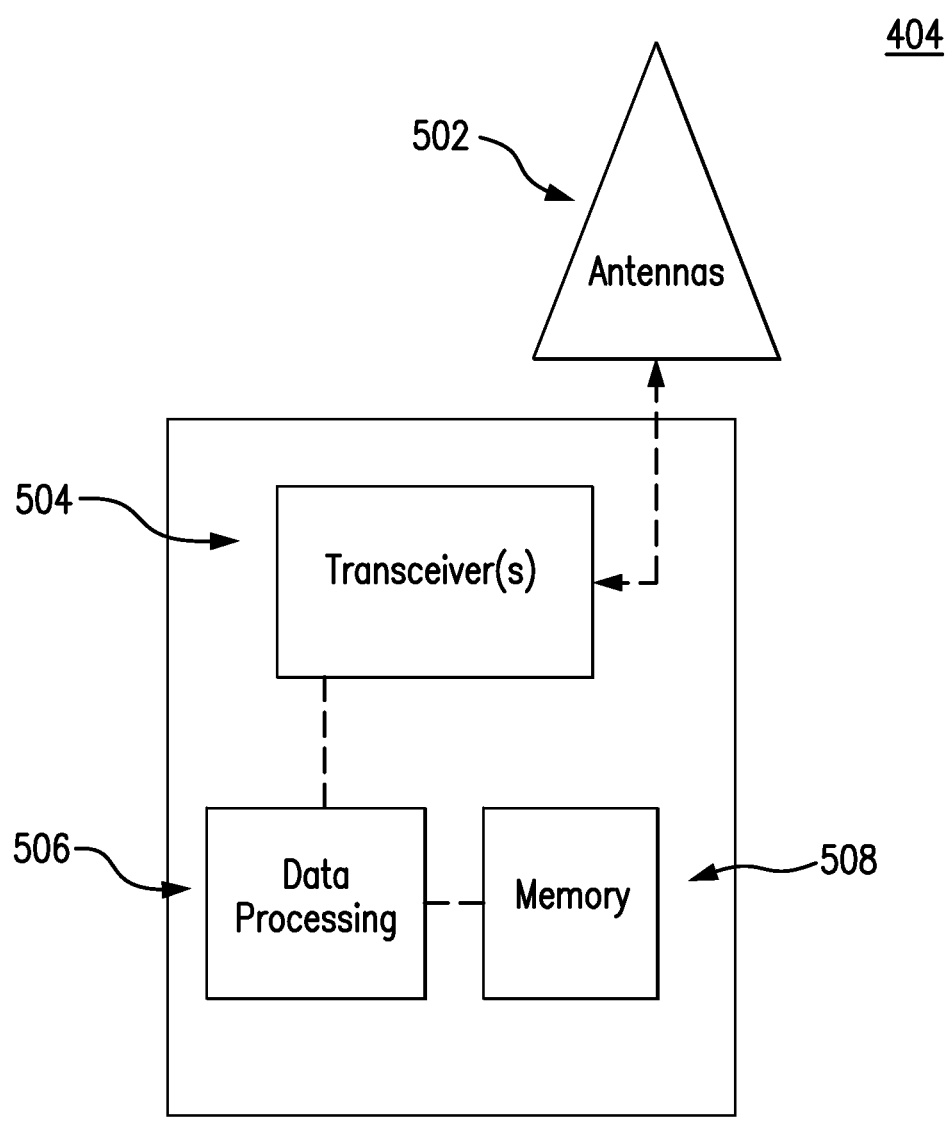
FIG. 5 is a block diagram of a user device in accordance with exemplary embodiments of the present invention.

FIG. 5 illustrates a block diagram of an exemplary UE communication device 404. As shown in FIG. 5, the UE communication device may include: one or more antennas 502, a data processing system 506, which may include one or more microprocessors and/or one or more circuits, such as an application specific integrated circuit (ASIC), field-programmable gate arrays (FPGAs), or the like, and a data storage or memory system 508, which may include one or more non-volatile storage devices and/or one or more volatile storage devices (e.g., random access memory (RAM)). The one or more antennas 502 are connected to transceiver 504, which is configured to transmit and receive signals via the one or more antennas 502.

In embodiments where data processing system 506 includes a microprocessor, computer readable program code may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes the data processing system 506 to perform steps described below (e.g., steps described below with reference to the flow charts shown in FIG. 7). In other embodiments, the UE communication device 404 is configured to perform steps described above without the need for code. That is, for example, data processing system 506 may consist of one or more ASICs. Hence, the features of the present invention described above may be implemented in hardware and/or software. For example, in particular embodiments, the functional components of the UE communication device 404 described above may be implemented by data processing system 506 executing computer instructions, by data processing system 506 operating independent of any computer instructions, or by any suitable combination of hardware and/or software.

Figure 6:
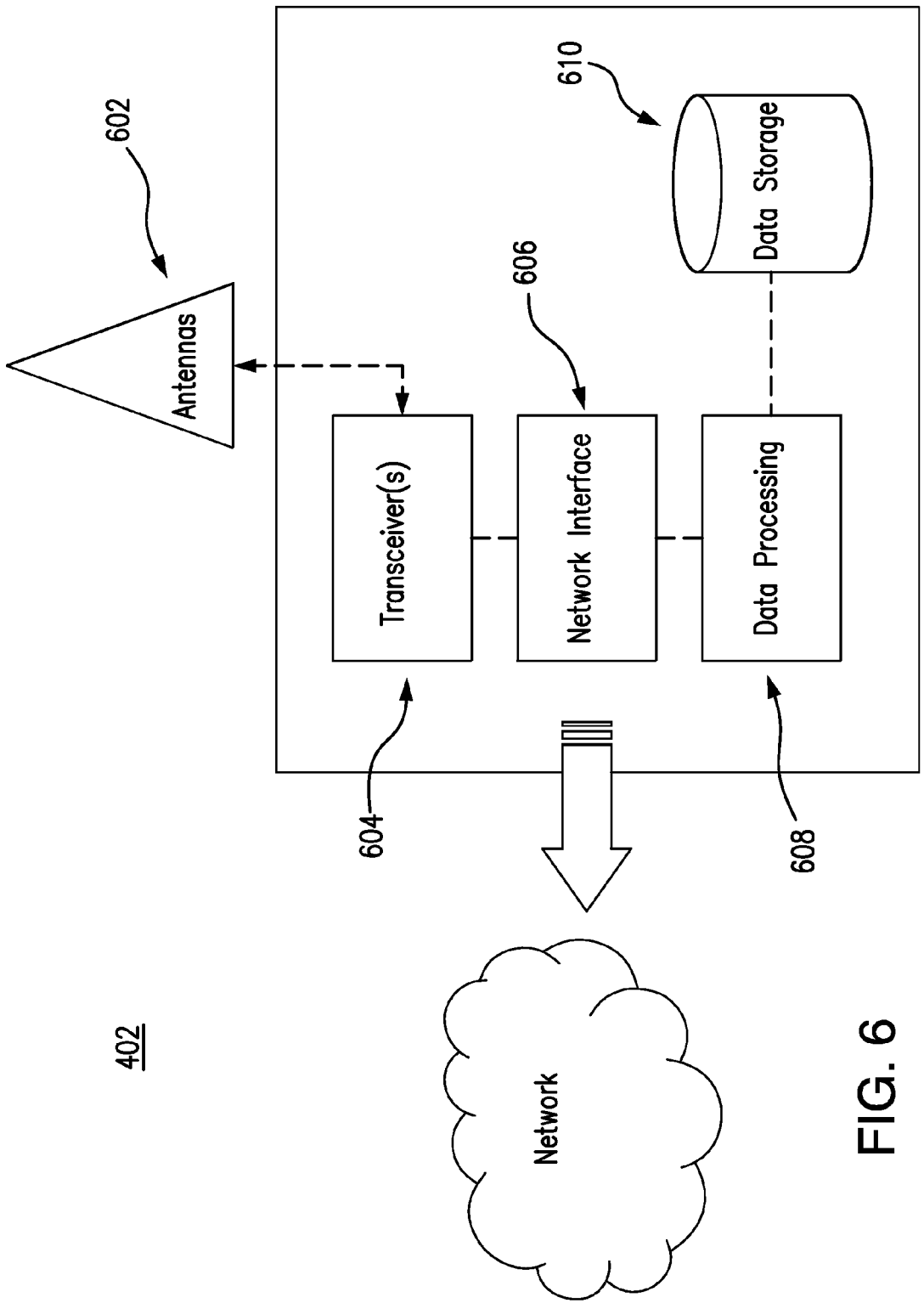
FIG. 6 is a block diagram of a base station in accordance with exemplary embodiments of the present invention.

FIG. 6 illustrates a block diagram of an exemplary base station 402. As shown in FIG. 6, the base station 402 may include: a data processing system 608, which may include one or more microprocessors and/or one or more circuits, such as an application specific integrated circuit (ASIC), field-programmable gate arrays (FPGAs), and the like; a network interface 606; and a data storage system 610, which may include one or more non-volatile storage devices and/or one or more volatile storage devices (e.g., random access memory (RAM)). The network interface 606 is connected to transceiver 604, which is configured to transmit and receive signals via one or more antennas 602. In particular embodiments, the antennas may be configured to include one or more antenna ports. For instance, antennas 602 may include a first antenna port 0, and a second antenna port 1, which correspond to ports 0 and 1 of the LTE specification. In an exemplary embodiment of the disclosed devices and methods, the base station 402 is a Node B or Evolved Node B.

In embodiments where data processing system 608 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 608 to perform steps described below (e.g., steps described below with reference to the flow chart shown in FIGS. 9 and 12). In other embodiments, the base station 402 is configured to perform steps described above without the need for code. That is, for example, data processing system 608 may consist merely of one or more ASICs. Hence, the features of the present invention described above may be implemented in hardware and/or software. For example, in particular embodiments, the functional components of the base station described above may be implemented by data processing system 608 executing computer instructions, by data processing system 608 operating independent of any computer instructions, or by any suitable combination of hardware and/or software.

Figure 7:
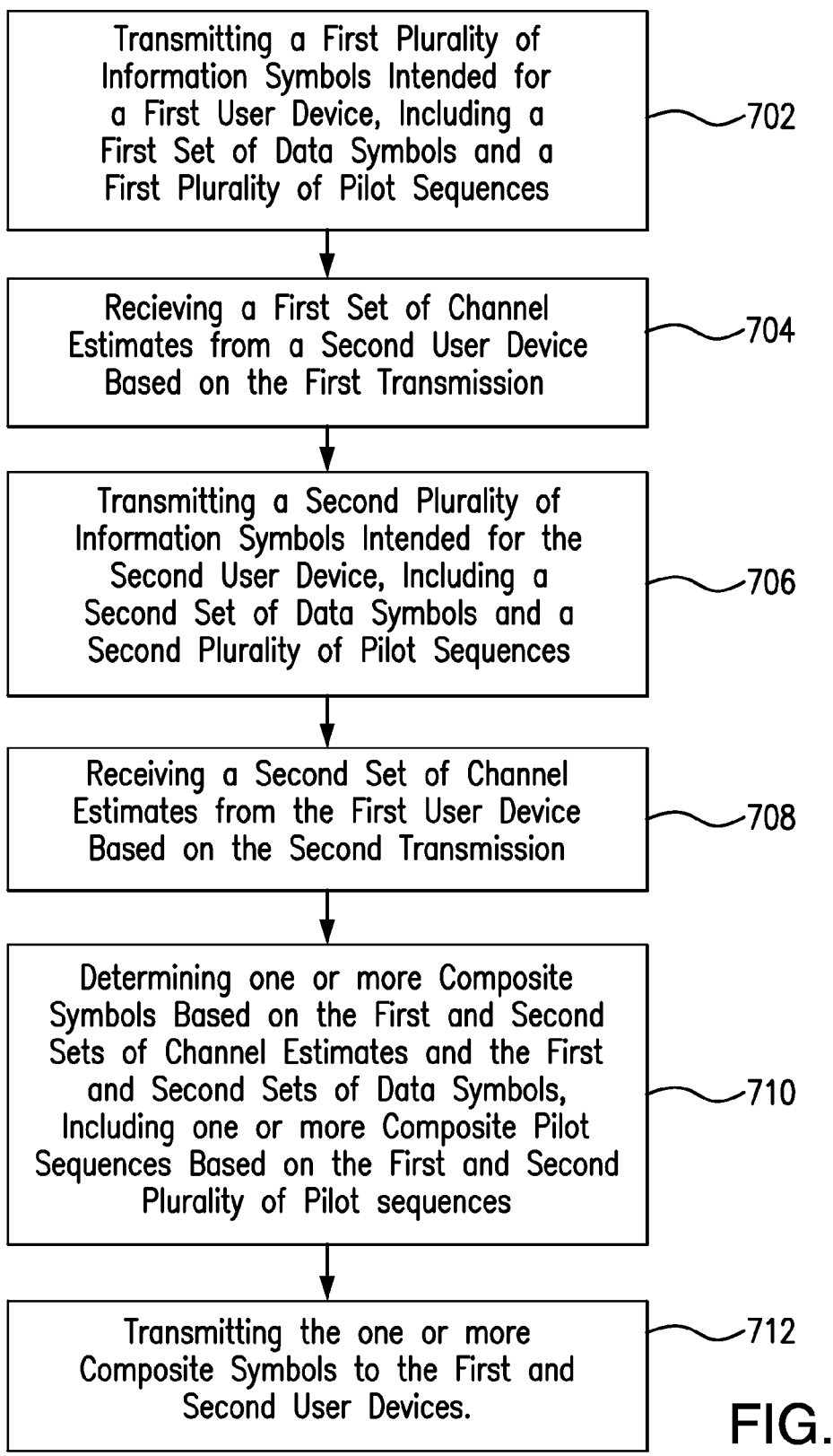
FIG. 7 is a flow chart illustrating a process for improving performance in a communication network in accordance with exemplary embodiments of the present invention.

Referring to FIG. 7, a flow chart 700 is shown, which illustrates a process for communicating information between a base station and user devices in a wireless communication network. According to certain embodiments of the present invention, the base station may include multiple transmit antennas while each of the user devices has only a single receive antenna. One of ordinary skill in the art will recognize that this scenario may be extended to the case of K transmit antennas and K user devices, for K>2. Similarly, the process 700 also applies to user devices that have more than one receive antenna.

For example, as illustrated in FIG. 4, a base station 402 having at least two transmit antennas transmits information to two user devices, 404 and 406. The user devices 404 and 406 each have a single receive antenna and can communicate with the base station 402 via one or more communication channels. However, they cannot communicate with each other.

In step 702, the base station 402 transmits a first plurality of information symbols intended for a first of the user devices 404. For instance, at a first time, t=1, base station 402 transmits two sets of information symbols, $u_1[1]$ and $u_2[1]$, which are intended for the first terminal, user device 404. (Here and in the description below, boldfaced variables indicate vectors representing a set of symbols.) The first set of information symbols, $u_1[1]$, may be transmitted from a first transmit antenna of the base station 402, while the second set of information symbols, $u_2[1]$, may be transmitted from a second transmit antenna of the base station 402. These signals are not only received by the intended user device, 404, but also by a second terminal, user device 406. Each set of information symbols, $u_j[t]$, include a set of data symbols and a set of pilot symbols. A set of pilot symbols forms a pilot sequence.

Similarly, in step 706, at t=2, the base station 402 transmits a second plurality of information symbols including two sets of information symbols, $u_1[2]$ and $u_2[2]$, which are intended for the second terminal, user device 406. This transmission will be overheard by the unintended recipient, user device 404. Each set of information symbols include a set of data symbols and a set of pilot symbols.

The resulting system is given by $$r_i[t]=H_{i1}[t]u_1[t]+H_{i2}[t]u_2[t]+z_i[t] \quad (1)$$

for i=1, 2, where $u_j[t]$ denotes the set of information symbols transmitted from antenna j, $H_{ij}[t]$ denotes the channel from transmit antenna j to terminal i, $r_i[t]$ denotes the set of received information symbols at terminal i, and $z_i[t]$ denotes the noise at terminal i.

The term symbol may be understood in the present context as representative of either a single symbol in a particular RE or as a block of multiple symbols, such as in the time, frequency, or code domains, or any combination thereof. In order to facilitate channel estimation, a pilot symbol structure is incorporated into the information symbols of the transmitted signal. The pilot symbols should be known to the receiving user devices. This pilot structure complements the stale feedback scheme and enables the estimation of both true and virtual channel taps. Exemplary pilot sequences are shown in FIG. 8.

According to particular embodiments, the set of information symbols $u_i[t]$ is comprised of N individual symbols, occupying N resource units. Those resource units may be distributed in time, frequency or code space, and may be contiguous or spread out. Independent of how the symbols are placed physically, without any loss of generality, one may consider $u_i[t]$ as a 1-dimensional sequence of length N, with elements $u_{j,k}[t]$, k=1 . . . N.

According to particular embodiments, the set of information symbols $u_i[t]$ is comprised of $N_d$ data symbols, denoted by $d_i[t]$, and $N_p=N-N_d$ pilot symbols, denoted by $p_i[t]$. A set of pilot symbols $p_i[t]$ may occupy a first portion of $u_i[t]$, e.g., the first $N_p$ resource units of $u_i[t]$. A set of data symbols $d_i[t]$ may occupy the last $N_d$ resource units of $u_i[t]$. This configuration may be defined by the following:

$$p_{j,k}[t]=u_{j,k}[t], k=1 \ldots N_p \quad (2)$$

and $$d_{j,k}[t]=u_{j,k+N_p}[t], k=1 \ldots N_d \quad (3)$$

Pilot symbols may be strategically placed within a given transmission in order to facilitate certain aspects of channel estimation. For instance, in an OFDM system, pilot symbols may be spread out in time and frequency, to capture frequency variations. Alternatively, in a GSM system, they may be lumped together in the middle of a time slot to capture time dispersion.

In one embodiment, the pilot symbols of two pilot sequences $p_1[t]$, and $p_2[t]$, are placed in the same air interface resource units. Accordingly, they will overlap completely at the receiver. In addition, the two pilot sequences may be chosen to be orthogonal to each other, i.e., that the inner product between the pilot sequences is zero:

$$\sum_{k=1}^{N_p} p_{1,k}[t]p_{2,k}^*[t] = 0 \quad (4)$$

The orthogonality property improves channel estimation at the receivers, user devices 404 and 406.

A received signal $r_i[t]$ at terminal i may be given by equation (1), with elements $r_{i,k}[t]$, k=1 . . . N. According to an embodiment, the first $N_p$ symbols correspond to pilot symbol locations. A terminal, for instance user devices 404 and 406, can compute the estimate $$\hat{H}_{ij}[t] = \sum_{k=1}^{N_p} r_{i,k}[t]p_{j,k}^*[t] \quad (5)$$

which may be scaled by $\Sigma_{k=1}^{N_p}p_{j,k}[t]p_{j,k}^*[t]$. Other channel estimation schemes may be used alternatively. For example, the characteristics of the impairment component in the received information symbols may be accounted for in the channel estimation process as in the case of minimum mean-square error (MMSE), maximum-likelihood (ML), or maximum-a-posteriori (MAP) channel estimation. Although $\hat{H}_{ij}[t]$ may be distorted by noise, it is not distorted by the other channel's signal, in the case of pilot orthogonality. Also, $N_p$ can be chosen large enough to ensure that $\hat{H}_{ij}[t]$ is close to the desired $H_{ij}[t]$. Such a selection reduces the number of data symbols $N_d$ that may be transmitted.

According to one embodiment of the present invention, each of the terminals, user devices 404 and 406, communicate channel information to the base station 402 after receiving the received information symbols discussed above. For example, user device 404 has received $r_1[1]$, while user device 406 has received $r_2[2]$, each containing the respective intended information symbols. Similarly, user device 404 has received $r_1[2]$, while user device 406 has received $r_2[1]$, each containing the respective unintended information symbols.

In steps 704 and 708, the base station 402 receives feedback information from the user devices 404 and 406. For instance, in step 704 the base station 402 receives a first set of channel estimates from the second user device 406, and in step 708 the base station 402 receives a set of channel estimates from the first user device 404. The first set may be based on a first transmission, such as the first plurality of information symbols transmitted in step 702, while the second set may be based on a second transmission, such as the second plurality of information symbols transmitted in step 706. According to particular embodiments, each terminal, i, feeds back the channel values $H_{ij}[t]$ for $t \neq i$. These values are received by the base station 402 before a third time, $t=3$.

Using the channel estimates, the base station 402 can synthesize received values $\hat{r}_1[2]$ and $\hat{r}_2[1]$ according to $$\hat{r}_i[t] = H_{i1}[t]u_1[t] + H_{i2}[t]u_2[t] \quad (6)$$

These values may be transmitted to the user devices 404 and 406 so that each can recover the parts it needs in order to form a virtual antenna.

In step 710, the base station 402 determines one or more composite values based on the channel estimates. For instance, the base station 402 may combine the synthesized values according to $$u_1[3] = \hat{r}_1[2] + \hat{r}_2[1] \quad (7)$$

In step 712, the composite value, which includes one or more composite pilot sequences, is transmitted from base station 402. It may be transmitted, for example, at $t=3$ from the first antenna. According to particular embodiments, the second antenna may be silent during transmission of the combined symbol.

The set of composite symbols $u_1[3]$, described by equation (7) may be expanded to yield $$u_1[3] = \hat{r}_1[2] + \hat{r}_2[1] \quad (8)$$
$$= H_{11}[2]u_1[2] + H_{12}[2]u_2[2] + H_{21}[1]u_1[1] + H_{22}[1]u_2[1]$$

where $H_{ij}[t]$ is used in place of $\hat{H}_{ij}[t]$ to maintain consistency. According to particular embodiments, the pilot and data symbols within each set of the information symbols $u_j[t]$, are the same as in the original transmissions at $t=1$ and $2$. In one embodiment, the first $N_p$ resource units of the set of composite symbols are occupied by pilot symbols and form the pilot sequence $p_1[3]$, where the kth symbol in the pilot sequence $$p_{1,k}[3] = H_{11}[2]p_{1,k}[2] + H_{12}[2]p_{2,k}[2] + H_{21}[1]p_{1,k}[1] + H_{22}[1]p_{2,k}[1] \quad (9)$$

for $k=1 \ldots N_p$. In this scheme, the pilot sequence itself is a linear combination of pilot sequences.

According to certain embodiments, the first user device 404 receives the set of composite symbols at time $t=3$. The received signal, $r_1[3]$, may be defined as $$r_1[3] = H_{11}[3]u_1[3] + z_1[3] = H_{11}[3](\hat{r}_1[2] + \hat{r}_2[1]) + z_1[3] \quad (10)$$

Because the expression of equation (10) includes $\hat{r}_2[1]$, user device 404 can use $r_1[3]$ to create a signal at a second virtual antenna, labeled 2, at time $t=1$, $r_2^v[1]$. This signal may be used to complement the true signal, $r_1[1]$, of user device 404. User device 404 received $r_1[2]$ earlier; thus, it can use it to eliminate $\hat{r}_1[2]$ from equation (10) to obtain the effective signal at virtual antenna 2, which is denoted $r_2^v[1]$ and given by $$r_2^v[1] = r_1[3] - H_{11}[3]r_1[2] \quad (11)$$
$$= H_{11}[3]\hat{r}_2[1] + z_1[3] - H_{11}[3]z_1[2]$$
$$= H_{11}[3]H_{21}[1]u_1[1] + H_{11}[3]H_{22}[1]u_2[1] + (z_1[3] - H_{11}[3]z_1[2])$$
$$H_{21}^v[1]u_1[1] + H_{22}^v[1]u_2[1] + z_2^v[1]$$

where $$H_{2j}^v[1] = H_{11}[3]H_{2j}[1] \quad (12)$$

is the effective channel to virtual antenna 2, and $$z_2^v[1] = z_1[3] - H_{11}[3]z_1[2] \quad (13)$$

is the effective noise at virtual antenna 2. Essentially, $r_2^v[1]$ looks like a received signal at a virtual second antenna at user device 404 at time $t=1$. The processing described in equations (11)-(13) may be referred to as "VDR processing."

Similarly, the second user device 406 can utilize $u_1[3]$, because it contains $\hat{r}[2]$. At time $t=3$, user device 406 receives $$r_2[3] = H_{21}[3]u_1[3] + z_2[3] = H_{21}[3](\hat{r}_1[2] + \hat{r}_2[1]) + z_2[3] \quad (14).$$

The second user device 406 can then use $r_2[3]$ to estimate a signal at a second virtual antenna, labeled 1, at time $t=2$, to complement its true signal $r_2[2]$. User device 406 eliminates $\hat{r}_2[1]$ from $r_2[3]$ to obtain its own signal from virtual antenna 1 at time $t=2$, given by $$r_1^v[2] = r_2[3] - H_{21}[3]r_2[1] \quad (15)$$
$$= H_{11}^v[2]u_1[2] + H_{12}^v[2]u_2[2] + z_1^v[2]$$

where $$H_{1j}^v[2] = H_{21}[3]H_{1j}[2] \quad (16)$$

is the effective channel to virtual antenna 1, and $$z_1^v[2] = z_2[3] - H_{21}[3]z_2[1] \quad (17)$$

is the effective noise at virtual antenna 1.

Overall, the above-described scheme requires 3 channel uses to transmit 4 information symbols. The total rate is R=4/3 symbols per channel use. Because each user device feeds back information to the base station, the base station can exploit the multi-user nature of the scenario to efficiently pack information for more than one terminal in subsequent transmissions, e.g., composite symbols, and minimize the number of time periods.

According to particular embodiments, a base station, such as the device illustrated in FIG. 6, includes one or more antennas 602, one or more transceivers 604, and data processing resources 608, which together are configured to improve data transmission in a communication network as detailed in flow chart 700.

Figure 9:
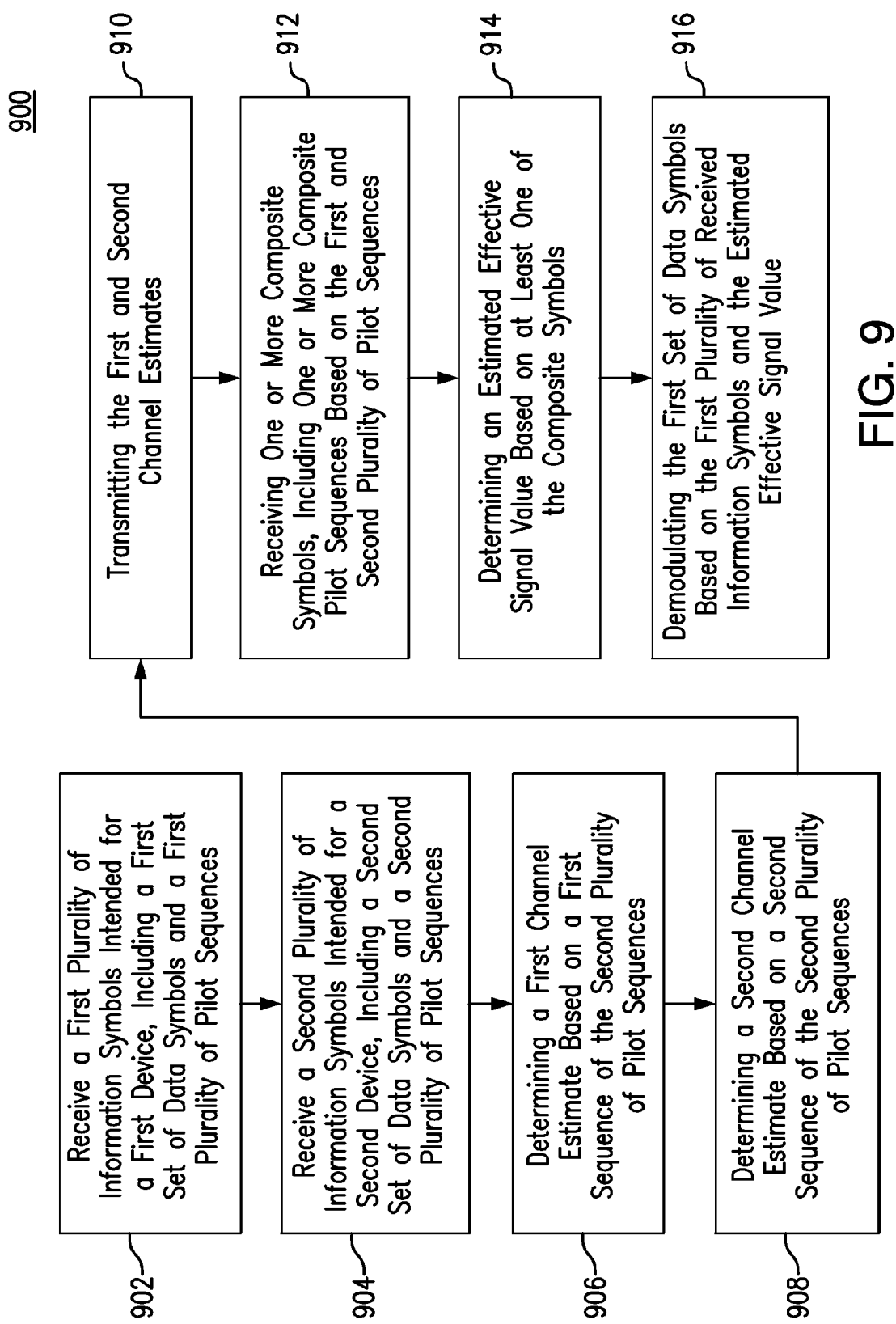
FIG. 9 is a flow chart illustrating a process for improving performance in a communication network in accordance with exemplary embodiments of the present invention.

With reference to FIG. 9, a flow chart 900 is shown, which illustrates a process for improving performance in a communication network that includes one or more base stations and a plurality of user devices.

In step 902, a user device, for instance, user device 404, receives a first plurality of received information symbols. These received information symbols include a first set of data symbols and a first plurality of pilot sequences. For instance, the received information symbols may include pilot sequences $p_1[1]$ and $p_1[2]$ shown in FIG. 8. They may be received from a base station, such as base station 402.

In step 904, user device 404, receives a second plurality of received information symbols. These received information symbols include a second set of data symbols and a second plurality of pilot sequences. For instance, the second plurality of received information symbols may include pilot sequences $p_1[2]$ and $p_2[2]$ shown in FIG. 8. According to particular embodiments, the first plurality of information symbols was intended for the first user device 404, while the second plurality of information symbols was intended for a different terminal in the communication network, for instance, user device 406.

In step 906, the user device 404 determines a first channel estimate based, at least part, on a first sequence of the second plurality of pilot sequences by correlating the second plurality of received information symbols with the first pilot sequence. For instance, user device 404 may determine a first channel estimate, $H_{11}[2]$, according to $$H_{11}[2] = \sum_{k=1}^{N_p} (r_{1,k}[2] p_{1,k}^*[2]) \tag{18}$$

where $N_p$ is the number of received pilot symbols, $p^*_{1,k}[2]$ is the conjugate of the $k^{th}$ symbol of the first sequence of the second plurality of pilot sequences, and $r_{1,k}[2]$ is the $k^{th}$ symbol of the second plurality of received information symbols.

Similarly, in step 908, the user device 404 determines a second channel estimate based, at least in part, on a second sequence of the second plurality of pilot sequences by correlating the second plurality of received information symbols with the second pilot sequence. For instance, user device 404 may determine a second channel estimate, $H_{12}[2]$, according to $$H_{12}[2] = \sum_{k=1}^{N_p} (r_{1,k}[2] p_{2,k}^*[2]) \tag{19}$$

where $N_p$ is the number of received pilot symbols, $p^*_{2,k}[2]$ is the conjugate of the $k^{th}$ symbol of the second sequence of the second plurality of pilot sequences, and $r_{1,k}[2]$ is the $k^{th}$ symbol of the second plurality of received information symbols.

In step 910, the user device 404 transmits the first and second channel estimates. These may be transmitted directly to a base station, such as base station 402, or to an intermediary network location that is in communication with the base station 402. One or more composite symbols are then determined and transmitted to user device 404. The symbols may be determined, for example, in accordance with the process described in flow chart 700.

In step 912, the user device 404 receives one or more composite symbols, which include one or more composite pilot sequences based on the first and second plurality of pilot sequences. The pilot sequence may be a combination of the first and second plurality of pilot sequences, for instance, as shown in equation (9).

In step 914, user device 404 implements the VDR scheme and determines an estimated effective signal value based on at least one of the received composite symbols. This value may be determined, for instance, using equations (10)-(13) as discussed with respect to flow chart 700. Step 914 may include, for example, determining a third channel estimate based on the one or more received composite symbols and forming a plurality of virtual antenna estimated effective signal values. The estimated effective signal values are based on the third channel estimate, the second plurality of received information symbols, and the one or more received composite symbols.

In step 916, user device 404 is able to demodulate the first set of data symbols using the first plurality of received information symbols and the estimated effective signal value.

According to particular embodiments, user equipment (UE), such as the device illustrated in FIG. 5, includes one or more antennas 502, one or more transceivers 504, and data processing resources 506, which together are configured to improve data transmission in a communication network as detailed in flow chart 900.

According to certain embodiments, further constraints regarding orthogonality may be placed on the pilot sequences. For instance, it may be a requirement that the pilot sequences also be orthogonal across time; i.e., that $p_1[1]$ and $p_2[1]$ are orthogonal to $p_1[2]$ and $p_2[2]$. In this scenario, and given that user device 404 has already computed the estimates $\hat{H}_{11}[2]$ and $\hat{H}_{12}[2]$, it can now compute the estimate of the channel tap product $H_{11}[3]H_{11}[2]$, which is given by $$\overline{H_{11}[3]H_{11}[2]} = \sum_{k=1}^{N_p} r_{1,k}[3] p_{1,k}^*[2] \tag{20}$$

Accordingly, there will not be any distortion from the other signal components (see equation 9), since all pilot sequences are orthogonal. Additionally, the product estimate (20) can be divided by $\hat{H}_{11}[2]$ to obtain an estimate $\hat{H}_{11}[3]$. Also, as with the result of equation (5), the product may be scaled by $\Sigma_{k=1}^{N_p} p_{j,k}[t] p_{j,k}^*[t]$.

Alternatively, user device 404 can compute the channel tap product estimate $\overline{H_{11}[3]H_{12}[2]}$ using pilot sequence $p_2[2]$, and divide it by $\hat{H}_{12}[2]$ to obtain another estimate of $H_{11}[3]$.

Also, in order to take advantage of the pilot energy to the largest extent, user device 404 can compute the estimate $\hat{H}_{11}[3]$ as an average:

$$\hat{H}_{11}[3] = \frac{\overline{H_{11}[3]H_{11}[2]} \cdot \hat{H}_{12}[2] + \overline{H_{11}[3]H_{12}[2]} \cdot \hat{H}_{11}[2]}{2 \cdot \hat{H}_{11}[2] \cdot \hat{H}_{12}[2]} \tag{21}$$

Any of the above-identified estimates enables user device 404 to complete the VDR transformation.

User device 406 may operate in a similar fashion. For example, at time t=3, it already has $\hat{H}_{21}[1]$ and $\hat{H}_{22}[1]$, and it can estimate $\overline{H_{11}[3]H_{21}[1]}$, $\overline{H_{11}[3]H_{22}[1]}$, or both, and get the corresponding estimate $\hat{H}_{11}[3]$.

According to certain embodiments of the present invention, user device 404 may determine virtual channel taps. For instance, given that user device 404 has the virtual antenna signal $r_2'[1]$, for instance, as determined with respect to equation (10), it may estimate the virtual channel tap $H_{21}{}^v[1]$. This may be accomplished by computing the inner product with pilot sequence $p_1[1]$. Similarly, user device 404 may use pilot sequence $p_2[1]$ to estimate $H_2{}^v[1]$, which enables it to complete the VDR. Thus, user device 404 can demodulate the symbols $d_{j,k}[1]$ using 2-antenna receiver techniques such as, for example, minimum mean-square error (MMSE) or successive interference cancellation (SIC). User device 406 may operate in a similar way, first estimating the true channel tap $H_{21}[3]$, and then the virtual taps $H_{11}{}^v[2]$ and $H_{12}{}^v[2]$.

According to particular embodiments, the requirement of orthogonality across time may be lifted. In this case, it may be necessary to introduce an additional sequence $p'_1[3]$, with $N_p$ symbols $p_{1,k}'[3]$, that can be placed in the same resource units as the previously discussed pilot sequences. The additional sequence should be orthogonal to the other sequences, and equation (9) may be modified as follows:

$$p_{1,k}[3]=H_{11}[2]p_{1,k}[2]+H_{12}[2]p_{2,k}[2]+H_{21}[2]p_{1,k}[1]+H_{22}[2]p_{2,k}[1]+p_{1,k}'[3] \quad (22)$$

In this embodiment, the composite pilot sequence is a combination of five pilot sequences. A user device 404, 406 (terminal i) can compute the channel estimate according to $$\hat{H}_{i1}[3] = \sum_{k=1}^{N_p} r_{i,k}[3]p_{1,k}'^*[3] \quad (23)$$

Again, this value may be scaled, and enables the receiver to complete the VDR transformation.

In certain embodiments, the pilot sequences $p_1[1]$, $p_2[1]$, $p_1[2]$, $p_2[2]$, and $p'_1[3]$ can be based on Walsh-Hadamard sequences or Zadoff-Chu sequences. These sequences may all share the same set of radio resource elements (time, frequency) as illustrated in FIG. 8.

The VDR scheme described above can be generalized to involve more than two terminals and more than two transmit antennas. The pilot structure also generalizes accordingly.

Figure 10:
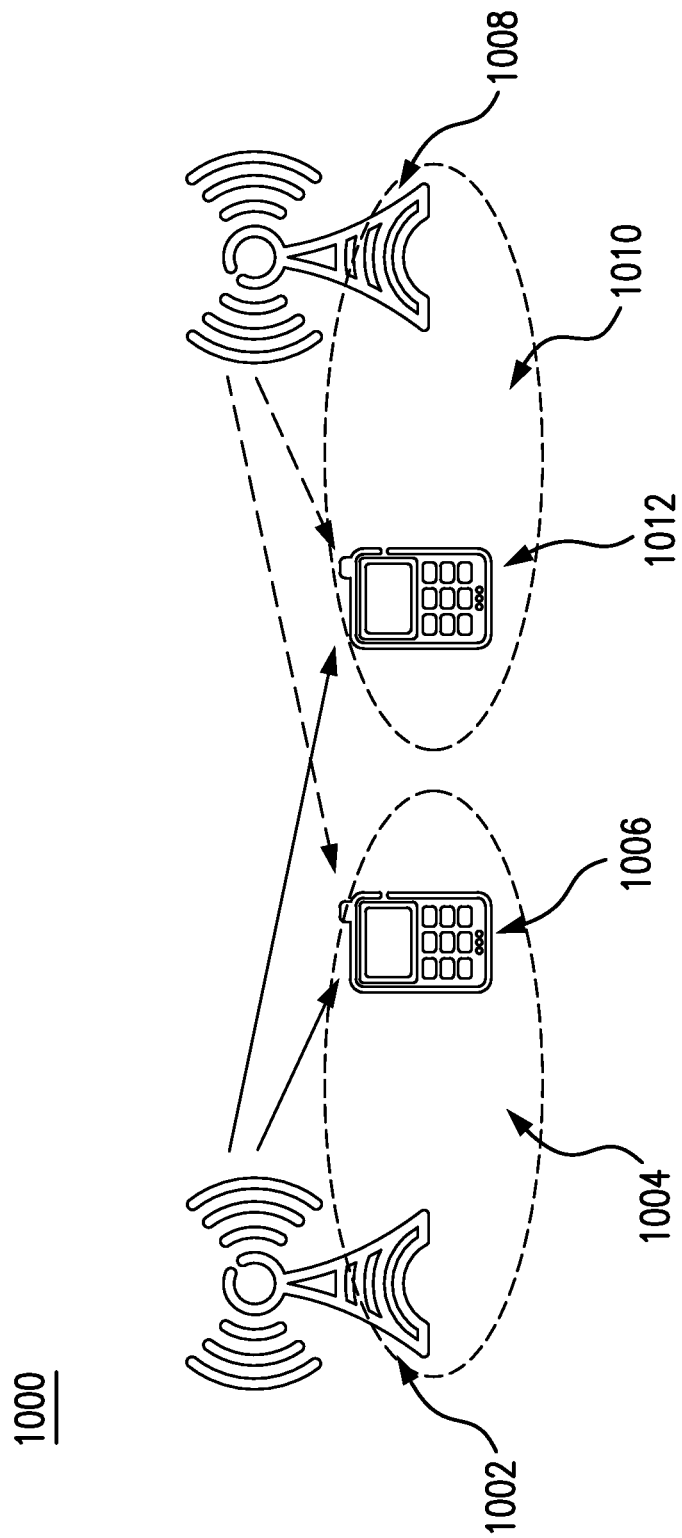
FIG. 10 is an illustration of a wireless communication system in accordance with exemplary embodiments of the present invention.

According to certain embodiments of the present invention, the disclosed VDR concept can be applied to a network including transmit antennas on different base stations and multiple user devices. For instance, the VDR concept may be adapted to a cell-edge scenario, as shown in FIG. 10. In this case, different user devices 1006, 1012 may belong to different base stations 1002, 1008, as shown by their respective cells 1004, 1010. Instead of signals from adjacent base stations fighting one another, they can be used constructively. For instance, at time t=1, base stations 1002 and 1008 may simultaneously transmit different components of a set of information symbols, such as symbols $u_1[1]$ and $u_2[1]$ respectively, both intended for a first terminal, user device 1006. The second terminal, user device 1012, also listens. Similarly, at time t=2, base stations 1002 and 1008 simultaneously transmit symbols $u_1[2]$ and $u_2[2]$ intended for user device 1012, while user device 1006 listens.

In the scenario where each terminal communicates with its own serving base station, user device 1006 feeds back two channel values $H_{1j}[2]$ to its serving base station 1002, and user device 1012 feeds back two channel values $H_{2j}[1]$ to its serving base station 1008. It is presumed that the base stations 1002, 1008 can communicate directly or through the infrastructure. After the necessary exchange of information, a composite super-symbol is transmitted simultaneously from both base stations 1002, 1008 at time t=3.

The transmission of a common super symbol is possible due to the exchange of information between the base stations and terminals. For instance, at a minimum, base station 1002 knows $H_{11}[2]$, $H_{12}[2]$, $u_1[1]$ and $u_2[2]$, while base station 1008 knows $H_{21}[1]$, $H_{22}[1]$, $u_2[1]$ and $u_2[2]$. In order to synthesize a received value $\hat{r}_1[2]$ according to equation (6), it is necessary to have $H_{11}[2]$, $H_{12}[2]$, $u_1[2]$ and $u_2[2]$ known by a single device. Therefore, if base station 1008 (or a higher layer in the network) sends $u_2[2]$ to base station 1002, the latter can construct $\hat{r}_1[2]$.

Similarly, in order to synthesize $\hat{r}_2[1]$, it is necessary to have $H_{21}[1]$, $H_{22}[1]$, $u_1[1]$ and $u_2[1]$ known by a single device. If base station 1002 sends $u_1[1]$ to base station 1008, the latter can construct $\hat{r}_2[1]$. Finally, base station 1002 can send $\hat{r}_1[2]$ to base station 1008, and base station 1008 can send $\hat{r}_2[1]$ to base station 1002. At time t=3, both base stations transmit the same combined symbol, for instance, $$u_1[3]=u_2[3]=\hat{r}_1[2]+\hat{r}_2[1] \quad (24)$$

This transmission may be done in broadcast mode, so that the received signal appears to come from one base station.

Figure 11:
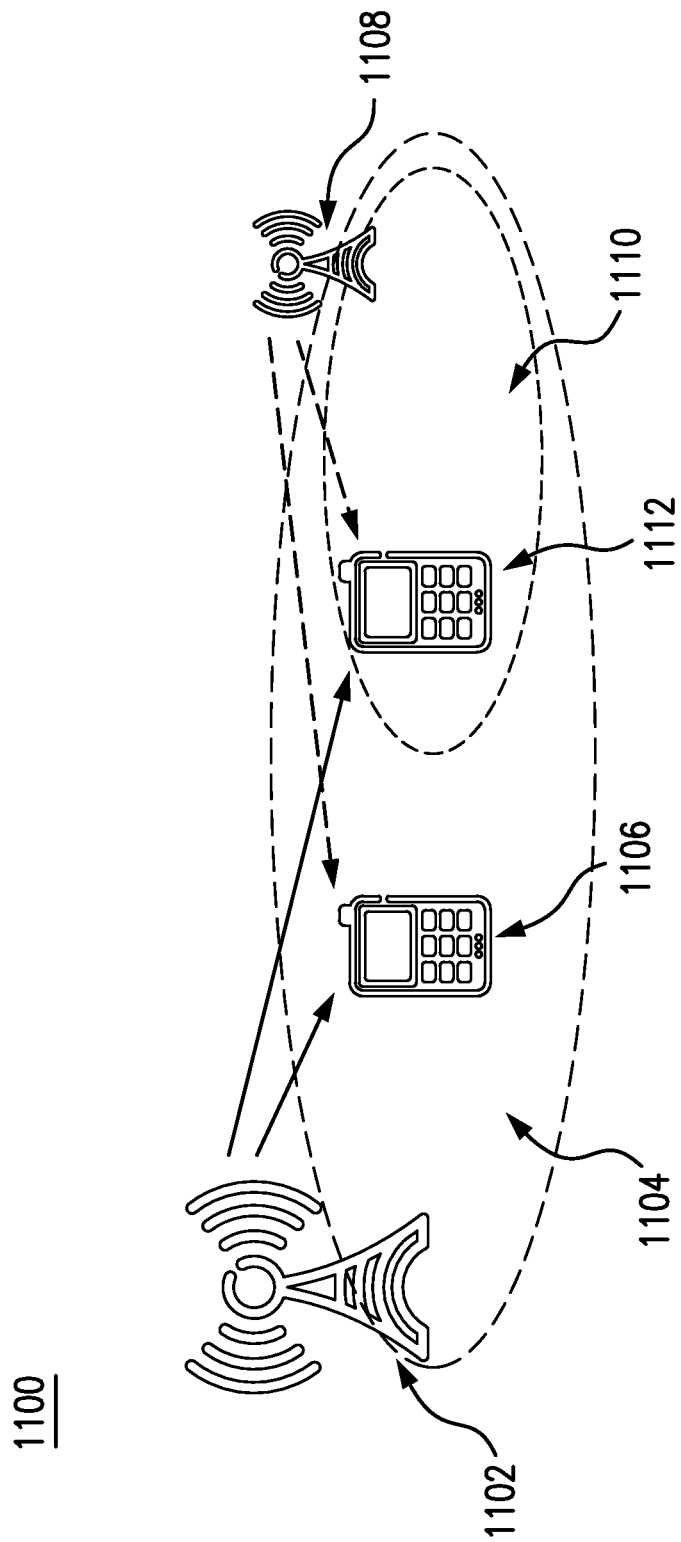
FIG. 11 is an illustration of a wireless communication system in accordance with exemplary embodiments of the present invention.

The pilot design described above readily applies to the two base station models illustrated in FIGS. 10 and 11. For t=1 and 2, base station i transmits pilot $p_i[t]$. For t=3, the network uses the channel feedback values received at both base stations to construct and transmit the pilot super-symbol according to equation (9) or (22).

Referring now to FIG. 12, a flow chart 1200 of a process for improving performance in a communication network that has a plurality of base stations and a plurality of user devices is shown.

In step 1202, a first base station 1002 transmits a first plurality of information symbols, which are intended for a first user device 1006. The information symbols include a first set of data symbols and a first pilot sequence. At step 1204, the first base station 1002 transmits a second plurality of information symbols intended for a second, and different, user device, 1012. The second information symbols include a second set of data symbols and a second pilot sequence.

In step 1206, base station 1002 receives a first channel estimate and a second channel estimate from the first user device 1006. Additionally, in step 1208, one or more communications indicating information transmitted from a second of the plurality of base stations, 1008, is received at the first base station 1002.

In step 1210, the first base station 1002 transmits one or more composite symbols based on the first and second plurality of information symbols.

The scheme described by flow chart 1200 also applies to the scenario illustrated in FIG. 11, where the network is a heterogeneous network and the second base station is not a macrocell base station and is within a cell of the first base station. This is essentially an extreme version of the cell-edge scenario shown in FIG. 10.

According to particular embodiments, a base station, such as the device illustrated in FIG. 6, includes one or more antennas 602, one or more transceivers 604, and data processing resources 608, which together are configured to improve data transmission in a communication network as detailed in flow chart 1200.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method for improving performance in a communication network, comprising:

receiving, at a first user device, a first plurality of received information symbols intended for said first user device, including a first set of data symbols and a first plurality of pilot sequences;

receiving, at said first user device, a second plurality of received information symbols intended for a second user device, including a second set of data symbols and a second plurality of pilot sequences;

determining, at said first user device, a first channel estimate based on a first sequence of said second plurality of pilot sequences;

determining, at said first user device, a second channel estimate based on a second sequence of said second plurality of pilot sequences;

transmitting, from said first user device, said first and second channel estimates;

receiving, at said first user device, one or more composite symbols, including one or more composite pilot sequences based on said first and second plurality of pilot sequences; and determining, at said first user device, an estimated effective signal value based on at least one of said received composite symbols.

2. The method of claim 1, further comprising:
demodulating, at said first user device, said first set of data symbols based on said first plurality of received information symbols and said estimated effective signal value.

3. The method of claim 2, wherein said first set of data symbols is demodulated based on one or more channel estimates.

4. The method of claim 1, wherein said first plurality of received information symbols is received from a base station having a first transmit antenna and a second transmit antenna, and further comprising:
determining, at said first user device, said first channel estimate, $H_{11}[2]$, by correlating said second plurality of received information symbols with a first sequence of said second plurality of pilot sequences; and
determining, at said first user device, said second channel estimate, $H_{12}[2]$, by correlating said second plurality of received information symbols with a second sequence of said second plurality of pilot sequences.

5. The method of claim 4, wherein said first channel estimate, $H_{11}[2]$, is determined according to $$H_{11}[2] = \sum_{k=1}^{N_p} (r_{1,k}[2]p^*_{1,k}[2])$$

where $N_p$ is the number of received pilot symbols, $p^*_{1,k}[2]$ is the conjugate of the $k^{th}$ symbol of said first sequence of said second plurality of pilot sequences, and $r_{1,k}[2]$ is the $k^{th}$ symbol of said second plurality of received information symbols, and said second channel estimate, $H_{12}[2]$, is determined according to $$H_{12}[2] = \sum_{k=1}^{N_p} (r_{1,k}[2]p^*_{2,k}[2])$$

where $N_p$ is the number of received pilot symbols, $p^*_{2,k}[2]$ is the conjugate of the $k^{th}$ symbol of said second sequence of said second plurality of pilot sequences, and $r_{1,k}[2]$ is the $k^{th}$ symbol of said second plurality of received information symbols.

6. The method of claim 4, wherein said first sequence of said second plurality of pilot sequences is received from said first transmit antenna and said second sequence of said second plurality of pilot sequences is received from said second transmit antenna.

7. The method of claim 1, wherein a first sequence of said first plurality of pilot sequences and a second sequence of said first plurality of pilot sequences are received in the same set of resource elements.

8. The method of claim 1, wherein said first sequence is received from a first transmit antenna and said second sequence is received from a second transmit antenna at the same time.

9. The method of claim 1, wherein said first plurality of pilot sequences is received at a first time and said second plurality of pilot sequences is received at a second time and said first plurality of pilot sequences is orthogonal to said second plurality of pilot sequences.

10. The method of claim 9, further comprising:
determining a channel tap product $H_{11}[3]H_{11}[2]$, given by:

$$\overline{H_{11}[3]H_{11}[2]} = \sum_{k=1}^{N_p} r_{1,k}[3]p^*_{1,k}[2]$$

where, $p^*_{1,k}[2]$ is the conjugate of the $k^{th}$ symbol of said first portion of said second plurality of pilot sequences, and $r_{1,k}[2]$ is the $k^{th}$ symbol of said second plurality of received information symbols.

11. The method of claim 9, further comprising:
determining a estimate of channel conditions, $H_{11}[3]$, given by:

$$\hat{H}_{11}[3] = \frac{\overline{H_{11}[3]H_{11}[2]} \cdot \hat{H}_{12}[2] + \overline{H_{11}[3]H_{12}[2]} \cdot \hat{H}_{11}[2]}{2 \cdot \hat{H}_{11}[2] \cdot \hat{H}_{12}[2]}$$

where $H_{i,j}[t]$ is representative of the channel condition between a receive antenna i and a transmit antenna j at a time t.

12. The method of claim 1, wherein at least one of said first and second plurality of pilot sequences is based on Walsh-Hadamard sequences.

13. The method of claim 1, wherein at least one of said first and second plurality of pilot sequences is based on Zadoff-Chu sequences.

14. The method of claim 1, wherein said first plurality of received information symbols is received from a base station having a first transmit antenna and a second transmit antenna,
a first sequence of said first plurality of pilot sequences is received from said first transmit antenna, and
a second sequence of said first plurality of pilot sequences is received from said second transmit antenna.

15. The method of claim 1, wherein a first component of said first plurality of received information symbols is received from a first base station and a second component of said first plurality of received information symbols is received from a second base station.

16. The method of claim 15, wherein said one or more composite symbols are received from said first base station and from said second base station.

17. The method of claim 15, wherein said communication network is a heterogeneous network and said second base station is not a macrocell base station and is within a cell of said first base station.

18. The method of claim 1, wherein a first sequence of said first plurality of pilot sequences and a second sequence of said first plurality of pilot sequences are orthogonal.

19. The method of claim 1, wherein determining said estimated effective signal value includes determining, at said first user device, a third channel estimate based on said one or more received composite symbols.

20. The method of claim 19, wherein determining said estimated effective signal value further includes generating a plurality of virtual antenna information symbols based on said third channel estimate, said second plurality of received information symbols, and said one or more received composite symbols.

21. A method for improving performance in a communication network, comprising: transmitting a first transmission comprising a first plurality of information symbols intended for a first user device, including a first set of data symbols and a first plurality of pilot sequences, wherein the first transmission is also sent to a second user device; receiving a first set of channel estimates from the second user device based on the first transmission; transmitting a second transmission comprising a second plurality of information symbols intended for said second user device, including a second set of data symbols and a second plurality of pilot sequences, wherein the second transmission is also sent to the first user device; receiving a second set of channel estimates from said first user device based on the second transmission; determining one or more composite symbols based on said first and second sets of channel estimates and said first and second sets of data symbols, including one or more composite pilot sequences based on said first and second plurality of pilot sequences; and transmitting said one or more composite symbols to said first and second user devices.

22. The method of claim 21, wherein determining the one or more composite symbols comprises:
synthesizing a first estimated receive value indicative of one or more signals received at said first user device;
synthesizing a second estimated receive value indicative of one or more signals received at said second user device; and
combining said first and second synthesized values to determine said one or more composite symbols.

23. The method of claim 22, wherein
said first estimated receive value, $r_2[1]$, is given by the expression:

$$r_2[1]=H_{21}[1]u_1[1]+H_{22}[1]u_2[1]$$

where said first plurality of information symbols includes $u_1[1]$ and $u_2[1]$, $H_{21}[1]$ represents channel conditions between said second user device and a first antenna of said base station for the first transmission, and $H_{22}[1]$ represents channel conditions between said second user device and a second antenna of said base station for the first transmission, and
said second estimated receive value, $r_1[2]$, is given by the expression:

$$r_1[2]=H_{11}[2]u_1[2]+H_{12}[2]u_2[2]$$

where said second plurality of information symbols includes $u_1[2]$ and $u_2[2]$, $H_{11}[2]$ represents channel conditions between said first user device and a first antenna of said base station for the second transmission, and $H_{12}[2]$ represents channel conditions between said first user device and a second antenna of said base station for the second transmission.

24. The method of claim 23, wherein at least one of said one or more composite symbols, $u_1[3]$, is given by:

$$u_1[3]=r_1[2]+r_2[1]$$

where $r_2[1]$ is said first estimated receive value and $r_1[2]$ is said second estimated receive value.

25. The method of claim 21, wherein the first set of channel estimates is based on at least one of said first plurality of pilot sequences and the second set of channel estimates is based on at least one of said second plurality of pilot sequences.

26. The method of claim 21, wherein a first sequence of said first plurality of pilot sequences and a second sequence of said first plurality of pilot sequences are transmitted in the same set of resource elements.

27. The method of claim 26, wherein said first sequence of said first plurality of pilot sequences is transmitted from a first transmit antenna and said second sequence of said first plurality of pilot sequences is transmitted from a second transmit antenna at the same time.

28. The method of claim 21, wherein said first plurality of pilot sequences is transmitted at a first time and said second plurality of pilot sequences is transmitted at a second time and said first plurality of pilot sequences is orthogonal to said second plurality of pilot sequences.

29. The method of claim 21, wherein at least one of said first and second plurality of pilot sequences is based on Walsh-Hadamard sequences.

30. The method of claim 21, wherein at least one of said first and second plurality of pilot sequences is based on Zadoff-Chu sequences.

31. The method of claim 21, further comprising:
transmitting a first sequence of said first plurality of pilot sequences on a first antenna of said base station; and
transmitting a second sequence of said first plurality of pilot sequences on a second antenna of said base station.

32. The method of claim 21, wherein at least one of said one or more composite pilot sequences, $p_{1,k}[3]$, is given by $$p_{1,k}[3]=H_{11}[2]p_{1,k}[2]+H_{12}[2]p_{2,k}[2]+H_{21}[1]p_{1,k}[1]+H_{22}[1]p_{2,k}[1]$$

for $k=1 \ldots N_p$, where $N_p$ is the number of transmitted pilot symbols,
$p_{1,k}[1]$ is the $k^{th}$ symbol in a first sequence of said first plurality of pilot sequences, which is transmitted from a first antenna of said base station,
$p_{1,k}[2]$ is the $k^{th}$ symbol in a first sequence of said second plurality of pilot sequences, which is transmitted from said first antenna of said base station,
$p_{2,k}[1]$ is the $k^{th}$ symbol in a second sequence of said first plurality of pilot sequences, which is transmitted from a second antenna of said base station,
$p_{2,k}[2]$ is the $k^{th}$ symbol in a second sequence of said second plurality of pilot sequences, which is transmitted from said second antenna of said base station,
$H_{11}[2]$ represents channel conditions between said first user device and said first antenna of said base station for the second transmission, $H_{12}[2]$ represents channel conditions between said first user device and said second antenna of said base station for the second transmission, $H_{21}[1]$ represents channel conditions between said second user device and said first antenna of said base station for the first transmission, and $H_{22}[1]$ represents channel conditions between said second user device and said second antenna of said base station for the first transmission.

33. The method of claim 21, wherein said first plurality of pilot sequences and said second plurality of pilot sequences are not orthogonal across time, and said one or more composite pilot sequences, $p_{1,k}[3]$, is based at least in part on a fourth pilot sequence, $p'_{1,k}[3]$, and is given by $$p_{1,k}[3]=H_{11}[2]p_{1,k}[2]+H_{12}[2]p_{2,k}[2]+H_{21}[1]p_{1,k}[1]+H_{22}[1]p_{2,k}[1]+p'_{1,k}[3]$$

for $k=1 \ldots N_p$, where $N_p$ is the number of transmitted pilot symbols, $p_{1,k}[1]$ is the $k^{th}$ symbol in a portion of said first plurality of pilot sequences, which is transmitted from a first antenna of said base station, $p_{1,k}[2]$ is the $k^{th}$ symbol in a portion of said second plurality of pilot sequences, which is transmitted from said first antenna of said base station, $p_{2,k}[1]$ is the $k^{th}$ symbol in a portion of said first plurality of pilot sequences, which is transmitted from a second antenna of said base station, $p_{2,k}[2]$ is the $k^{th}$ symbol in a portion of said second plurality of pilot sequences, which is transmitted from said second antenna of said base station, $H_{11}[2]$ represents channel conditions between said first device and said first antenna of said base station for the second transmission, $H_{12}[2]$ represents channel conditions between said first user device and said second antenna of said base station for the second transmission, $H_{21}[1]$ represents channel conditions between second user device and said first antenna of said base station for the first transmission, and $H_{22}[1]$ represents channel conditions between said second user device and said second antenna of said base station for the first transmission.

34. The method of claim 21, further comprising:
transmitting a first component of said first plurality of information symbols on a first antenna of said base station; and
transmitting a second component of said first plurality of information symbols on a second antenna of said base station, and
transmitting at least one of said one or more composite symbols on said first antenna, wherein said second antenna is silenced during transmission of said at least one composite symbol.

35. The method of claim 21, wherein a first sequence of said first plurality of pilot sequences and a second sequence of said first plurality of pilot sequences are orthogonal.

36. A method for improving performance in a communication network having a plurality of base stations and a plurality of user devices, comprising:
transmitting, from a first of said plurality of base stations, a first transmission comprising a first plurality of information symbols intended for a first of said plurality of user devices, including a first set of data symbols and a first pilot sequence;
transmitting, from said first base station, a second transmission comprising a second plurality of information symbols intended for a second of said plurality of user devices, including a second set of data symbols and a second pilot sequence;
receiving, at said first base station, a first channel estimate and a second channel estimate from said first user device based on the second transmission;
receiving, at said first base station, one or more inter-base station messages comprising channel estimates and information symbols transmitted from a second of said plurality of base stations; and
transmitting, from said first base station, one or more composite symbols based on said first and second plurality of information symbols, said first and second channel estimates, and said inter-base station messages.

37. The method of claim 36, wherein said one or more communications are received from said second base station.

38. The method of claim 36, wherein at least one of said one or more communications is information symbols previously transmitted from said second base station.

39. The method of claim 36, further comprising:
determining an estimated receive value based on said first and second channel estimates and said inter-base station messages,
wherein at least one of said composite symbols includes said estimated receive value.

40. The method of claim 39, further comprising:
transmitting said estimated receive value from said first base station to said second base station.

41. The method of claim 36, further comprising:
transmitting said first plurality of information symbols from said first base station to said second base station.

42. The method of claim 36, wherein said communication network is a heterogeneous network and said second base station is not a macrocell base station and is within a cell of said first base station.

* * * * *

UNITED STATES PATENT AND TRADEMARK OFFICE
CERTIFICATE OF CORRECTION

PATENT NO. : 8,953,660 B2  
APPLICATION NO. : 13/633731  
DATED : February 10, 2015  
INVENTOR(S) : Khayrallah et al.

Page 1 of 1

It is certified that error appears in the above-identified patent and that said Letters Patent is hereby corrected as shown below:

On the title page, item (74), under "Attorney, Agent, or Firm", in Column 2, Line 2, delete "Maneck," and insert -- Manbeck, --, therefor.

In the specification,

In Column 12, Line 61, delete "$H_2^v[1]$," and insert -- $H_{22}^v[1]$, --, therefor.

Signed and Sealed this  
Eighth Day of March, 2016

Michelle K. Lee  
*Director of the United States Patent and Trademark Office*